(12) United States Patent
Hanlon et al.

(10) Patent No.: US 7,709,995 B2
(45) Date of Patent: May 4, 2010

(54) SHAPE MEMORY ALLOY WIRE LATCH ACTUATOR

(75) Inventors: Samuel R. Hanlon, Livonia, MI (US); John F. Nathan, Highland Township, MI (US); H. Winston Maue, Farmington Hills, MI (US); Mark Keyser, Lake Orion, MI (US); Karl Kennedy, Fraser, MI (US)

(73) Assignee: Lear Corporation, Southfield, MI (US)

( * ) Notice: Subject to any disclaimer, the term of this patent is extended or adjusted under 35 U.S.C. 154(b) by 312 days.

(21) Appl. No.: 12/026,759

(22) Filed: Feb. 6, 2008

(65) Prior Publication Data

US 2009/0195121 A1    Aug. 6, 2009

(51) Int. Cl.
*H01H 71/18*    (2006.01)

(52) U.S. Cl. .................. 310/306; 60/527; 297/330

(58) Field of Classification Search .......... 310/306, 310/307; 60/527, 528; 297/330, 328, 340, 297/344.1
See application file for complete search history.

(56) References Cited

U.S. PATENT DOCUMENTS

| | | | | |
|---|---|---|---|---|
| 4,296,603 A | * | 10/1981 | Manecke et al. | 60/528 |
| 4,665,334 A | * | 5/1987 | Jamieson | 310/306 |
| 4,806,815 A | * | 2/1989 | Honma | 310/307 |
| 5,325,880 A | | 7/1994 | Johnson et al. | |
| 5,575,790 A | * | 11/1996 | Chen et al. | 606/60 |
| 6,247,678 B1 | | 6/2001 | Hines et al. | |
| 6,374,608 B1 | * | 4/2002 | Corris et al. | 60/528 |
| 6,404,098 B1 | * | 6/2002 | Kayama et al. | 310/307 |
| 6,742,761 B2 | | 6/2004 | Johnson et al. | |
| 6,813,886 B2 | * | 11/2004 | Cerruti et al. | 60/527 |
| 6,851,260 B2 | * | 2/2005 | Mernø | 60/527 |
| 6,883,774 B2 | | 4/2005 | Nielsen et al. | |
| 6,840,257 B2 | | 11/2005 | Dario et al. | |
| 7,052,251 B2 | | 5/2006 | Nason et al. | |
| 7,055,793 B2 | | 6/2006 | Biehl et al. | |
| 7,481,054 B2 | * | 1/2009 | Hageman et al. | 60/527 |
| 2005/0146147 A1 | | 7/2005 | Niskanen et al. | |
| 2005/0178988 A1 | | 8/2005 | Biehl et al. | |
| 2006/0013716 A1 | | 1/2006 | Nason et al. | |
| 2006/0138370 A1 | | 6/2006 | Biehl et al. | |
| 2007/0193267 A1 | * | 8/2007 | He | 60/527 |
| 2008/0120976 A1 | * | 5/2008 | Kennedy et al. | 60/528 |
| 2008/0129098 A1 | * | 6/2008 | Kennedy et al. | 297/354.1 |
| 2009/0195121 A1 | * | 8/2009 | Hanlon et al. | 310/307 |

\* cited by examiner

*Primary Examiner*—Karl I Tamai
(74) *Attorney, Agent, or Firm*—Brooks Kushman P.C.

(57) ABSTRACT

A linear motion actuator is disclosed in which an actuator shaft is held in a ready position by a latching ring. A spring is attached to the actuator shaft to exert a biasing force on the actuator shaft biasing it toward its actuated position. The latching ring receives one end of the actuator shaft and has locking elements that hold the actuator shaft in the ready position. A latching ring is rotated to selectively release the locking element. A shape memory alloy link extends partially around the latching ring and is secured to the latching ring. The link is shortened when current is applied to the link causing the link to rotate and release the locking element.

19 Claims, 7 Drawing Sheets

SHAPE MEMORY ALLOY WIRE LATCH ACTUATOR

BACKGROUND OF THE INVENTION

1. Field of the Invention

The present invention relates to a system for actuating a latch mechanism with a linear motion actuator.

2. Background Art

Latches are used to hold selectively movable members in a desired orientation. Latches are frequently manually actuated by a user grasping a handle and pushing or pulling on the handle to release the latch and allow relatively movable parts to move from a latched position to a released position. Latches may be used in vehicle seats to hold the seat to the floor, or to hold the seatback in a selected position relative to the seat base. Latches may also be used for interior compartment covers or in other applications.

There is a need for an economical, robust and easily operated latch actuator that may be electronically actuated. There is also a need for an electronically actuated latch that is responsive to electronic signals from switches that may be, for example, a push button switch on a vehicle door, a radio-frequency key fob switch, a microprocessor controlled switch, or the like.

The present invention is directed to providing a linear motion actuator or a system for actuating a latch mechanism that fulfills the above long-felt needs as summarized below.

SUMMARY OF THE INVENTION

According to one aspect of the present invention, a linear motion actuator is provided for releasing a latch that holds a latched member in a latched position. The actuator includes a housing that defines a cavity in which one end of an actuator shaft is received. The actuator shaft may be in a ready position in which the actuator shaft is partially retracted within the housing and an actuated position in which the actuator shaft is extended from the housing to a greater extent than when the actuator shaft is in the ready position. A spring exerts a biasing force on the actuator shaft biasing the actuator shaft toward the actuated position. A latching ring may be disposed within the housing which receives the first end of the actuator shaft. The latching ring has a locking element that holds the actuator shaft within the latching ring when the actuator shaft is in the ready position. The locking element is selectively released by rotating the latching ring. A shape memory alloy link is anchored to the housing and extends partially around the latching ring. The link is shortened to a second length when current is applied to the link so that the link rotates the latching ring when shortened. Rotation of the latching ring releases the locking element of the latching ring.

The actuator shaft may be provided with a connector that is used to release the latched member. A spring is preferably attached to the actuator shaft with the spring being assembled over the actuator shaft. The spring engages the housing and the connector in the ready position.

The latching ring may receive a tubular member that receives the actuator shaft, a plurality of ball bearings that are assembled to a plurality of holes in the tubular member and into an annular groove in the actuator shaft. The latching ring may have a plurality of axially extending grooves. The ball bearings hold the tubular member in the actuator shaft in the ready position until the link is shortened which rotates the latching ring until the grooves are aligned with the ball bearings. The ball bearings are then allowed to move within the grooves and the actuator shaft is released to move to the released position.

A return spring may be provided that biases the latching ring to rotate in the opposite rotary direction relative to the direction that the link rotates the latching ring when current is applied to the link.

The linear motion actuator may include an electrical circuit that receives an actuation signal and provides current to the link in response to the actuation signal. The electrical circuit may include two terminals that are selectively connected by either a metal portion of a actuator shaft receptacle or an attachment to the actuator shaft receptacle that completes the circuit between the two terminals. The electrical circuit may prevent current from being provided to the link for a period of time that corresponds to the time required for the link to cool and return from the second length to the first length.

A system for actuating a latch mechanism is also provided. According to the system, an electrical signal is provided to a circuit for a latch release mechanism. Current is supplied to a link of a first length that changes to a second length that differs from the first length. A release annulus is rotated in a first rotary direction and cooperates with a plurality of ball bearings. A sleeve partially receives the ball bearings in holes formed in the sleeve and an actuator shaft having an annular groove is also provided. The release annulus has a plurality of axially extending grooves that when aligned with the ball bearings to partially receive the ball bearings, permits the actuator shaft to move in a first axial direction relative to the annulus. The latch mechanism is actuated by the axial movement of the actuator shaft in a first direction. To reset the latch mechanism, the actuator shaft is driven in a second axial direction that is opposite to the first axial direction until the annular groove is aligned with the ball bearings and the sleeve. The annulus is partially rotated to move the ball bearings out of the axially extending grooves in the release annulus.

The link may be a loop of shape memory alloy wire that is wrapped around a portion of the annulus and is operatively connected to the annulus to partially rotate the annulus when the loop changes from the first length to the second length.

A return spring may be provided that exerts a rotary biasing force on the annulus in a second rotary direction that is opposite to the first rotary direction. The return spring may be used to partially rotate the annulus to move the ball bearings out of the axially extending grooves in the release annulus.

The circuit may include a lockout portion that includes a pair of switch contacts that are opened when the latch mechanism is in a ready condition. The switch contacts are closed when the actuator shaft receptacle moves in the first axial direction thereby preventing current from being supplied to the link when the switch contacts are closed. The link is permitted to cool when closure of the lockout switch contacts prevents current from being provided to the link. The switch contacts are open when the actuator shaft is driven in the second axial direction to reset the latch mechanism.

These and other aspects of the invention will be better understood in view of the attached drawings and the following detailed description of the illustrated embodiments.

DETAILED DESCRIPTION OF THE PREFERRED EMBODIMENT(S)

Figure 1:
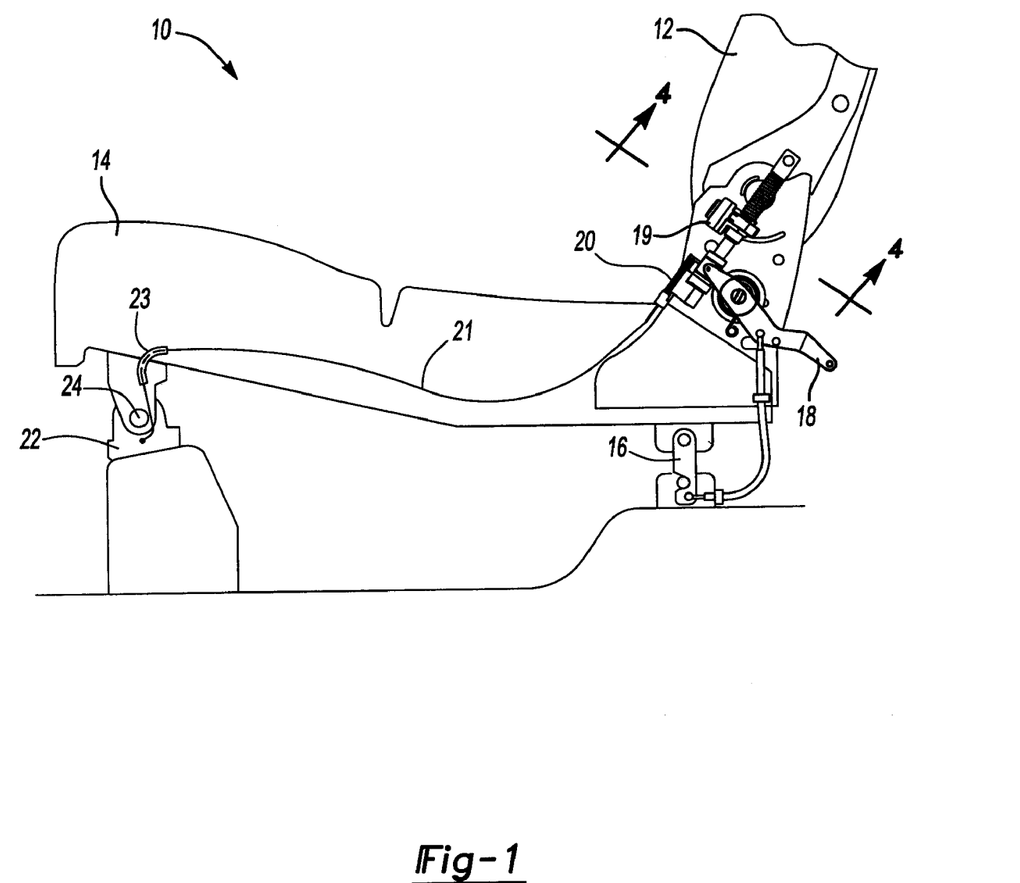
FIG. 1 is a fragmentary side-elevation view of a vehicle seat having a latch mechanism that is provided with a linear motion actuator made in accordance with one embodiment of the present invention.

Referring to FIG. 1, a vehicle seat 10 that includes a seatback 12 and a seat base 14 is provided with a latch assembly 16. Latch assembly 16 operates to latch and unlatch relatively movable parts of the vehicle seat 10. The movable parts may include tilt and tumble latches of vehicle seat 10 as illustrated, such as those used to connect the seat base to the floor of the vehicle and the seatback 12 relative to the seat base 14. A lever handle 18 is connected to the latch 16 for manually operating the latch 16. The latch 16 is also connected to an electronic latch actuator 19. The latch actuator 19 also includes a reset apparatus 20 that is connected to a reset cable 21. The seat base 14 rotates counter-clockwise to a released position when the actuator 19 releases the latch 16. This causes the reset cable strand 21 to be effectively shortened. The actuator is reset by rotating the seat base 14 in the clockwise direction which causes the reset cable strand 21 to be extended which resets the reset apparatus 20.

The reset cable strand 21 is connected to a tumble pivot bracket 22 and is routed through a cable conduit fitting 23 that secures the conduit (not shown) of the cable. The tumble pivot bracket 22 has a pivot 24 about which the seat base pivots when the seat 10 is pivoted or tumbled forward.

Figures 2, 3:
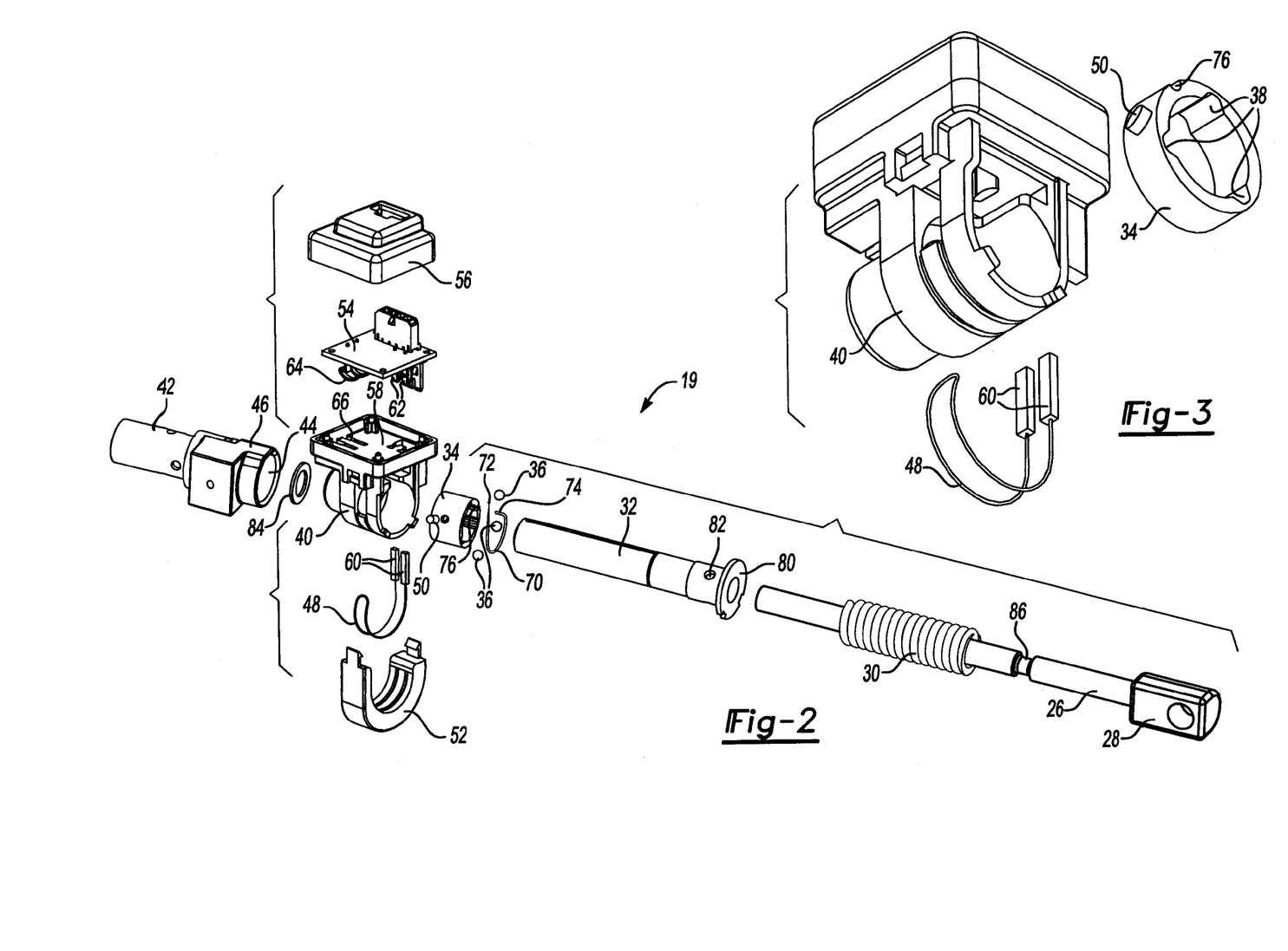
FIG. 2 is an exploded perspective view of a linear motion actuator made according to one embodiment of the present invention.
FIG. 3 is a partial exploded perspective view of a portion of the linear motion actuator shown in FIG. 2.

Referring to FIGS. 2 and 3, the component parts of the electronic latch actuator 19 are shown in two exploded perspective views. A power shaft 26 has a connector 28 on one end that is attached to the seatback 12 or other latched member. A power spring 30 biases the power shaft 26 toward an extended position. The power shaft 26 is received within a tubular retainer 32. The tubular retainer 32 is received within an annular ring 34. A plurality of ball bearings 36 are retained in the tubular retainer 32 and secure the power shaft 26 within the annular ring 34 as will be more fully described below. The ball bearings 36 may be moved into axially extending grooves 38 at which point the power shaft 26 is released and driven into its actuated, or extended, position. The power shaft 26, tubular retainer 32 and annular ring 34 are partially or wholly received within a housing 40.

A reset shaft receptacle 42 that is part of the reset apparatus 20 is attached to the opposite end of the power shaft 26 from the connector 28. The reset shaft receptacle 42 includes a tubular body 44 and a contact area 46.

A shape memory alloy (SMA) loop 48 is assembled around the annular ring 34 and is looped over a loop receiving protrusion 50 that extends radially outwardly from the annular ring 34. A loop cover 52 is provided to enclose the shape memory alloy loop 48 and the loop receiving protrusion 50.

A circuit board 54 is assembled to the housing 40 with a circuit board cover 56 enclosing the circuit board 54. The circuit board 54 is assembled to a circuit board base 58 that is formed on the housing 40. SMA loop terminals 60 are provided on the ends of the SMA loop 48 which are received in loop terminal receptacles 62 that connect the SMA loop 48 to the circuit board 54. A pair of lockout terminals 64 extend through a pair of lockout terminal slots 66 in the circuit board 54 and circuit board base 58. The lockout terminals 64 form a normally open contact that permits current to be provided to the SMA loop 48 when the actuator is actuated.

A return spring 70 is provided to rotate the annular ring 34 in the opposite direction relative to the direction that the annular ring 34 is rotated by energization of the SMA loop 48. The return spring 70 has a base attachment end 72 that is attached to the housing 40 and a ring attachment end 74 that is attached to the annular ring 34. An axial slot 76 is provided in the annular ring 34 within which the ring attachment end 74 of the return spring 70 is received.

The contact area 46 of the reset shaft receptacle 42 is held in a spaced relationship relative to the lockout terminals 64 when the electronic latch actuator 19 is in its ready position. However, when the electronic actuator 19 is actuated and the power shaft 26 is released, the contact area 46 on the reset shaft receptacle 42 closes the gap between the lockout terminals 64. When the circuit including the lockout terminals 64 is completed, the actuator circuit prevents current from being provided to the SMA loop 48. Repetitive actuation or actuation prior to the time that the SMA loop has cooled sufficiently to return to its original length is prevented by preventing current from being provided to the SMA loop 48 for a time after the electronic latch actuator 19 is actuated.

The tubular retainer 32 includes a head flange 80 that establishes the axial position of the tubular retainer 32 relative to the housing 40. A plurality of ball receptacle holes 82 are provided in the tubular retainer 32. The ball bearings 36 are retained within the ball receptacle holes 82. The ball bearings 36 are received in the annular ring 34 and selectively positioned either in the axially extending grooves 38 in the actuated position or circumferentially adjacent to the grooves 38 in the latched or ready position. A stop 84 is provided on the tubular retainer 32 to retain the tubular retainer 32 within the housing 40. The stop 84 secures the tubular retainer 32 within the housing 40 on the opposite side of the retainer 32 from the head flange 80. An annular slot 86 is provided in the power shaft 26. When the actuator 19 is in its latched or ready position, the ball bearings 36 are held in the annular slot 86. When the annular ring 34 is rotated, the ball bearings 36 enter the axial grooves 38 allowing the power shaft 26 to move to its actuated position. Operation of the release mechanism will be described in greater detail with reference to FIGS. 4-6.

Figure 4:
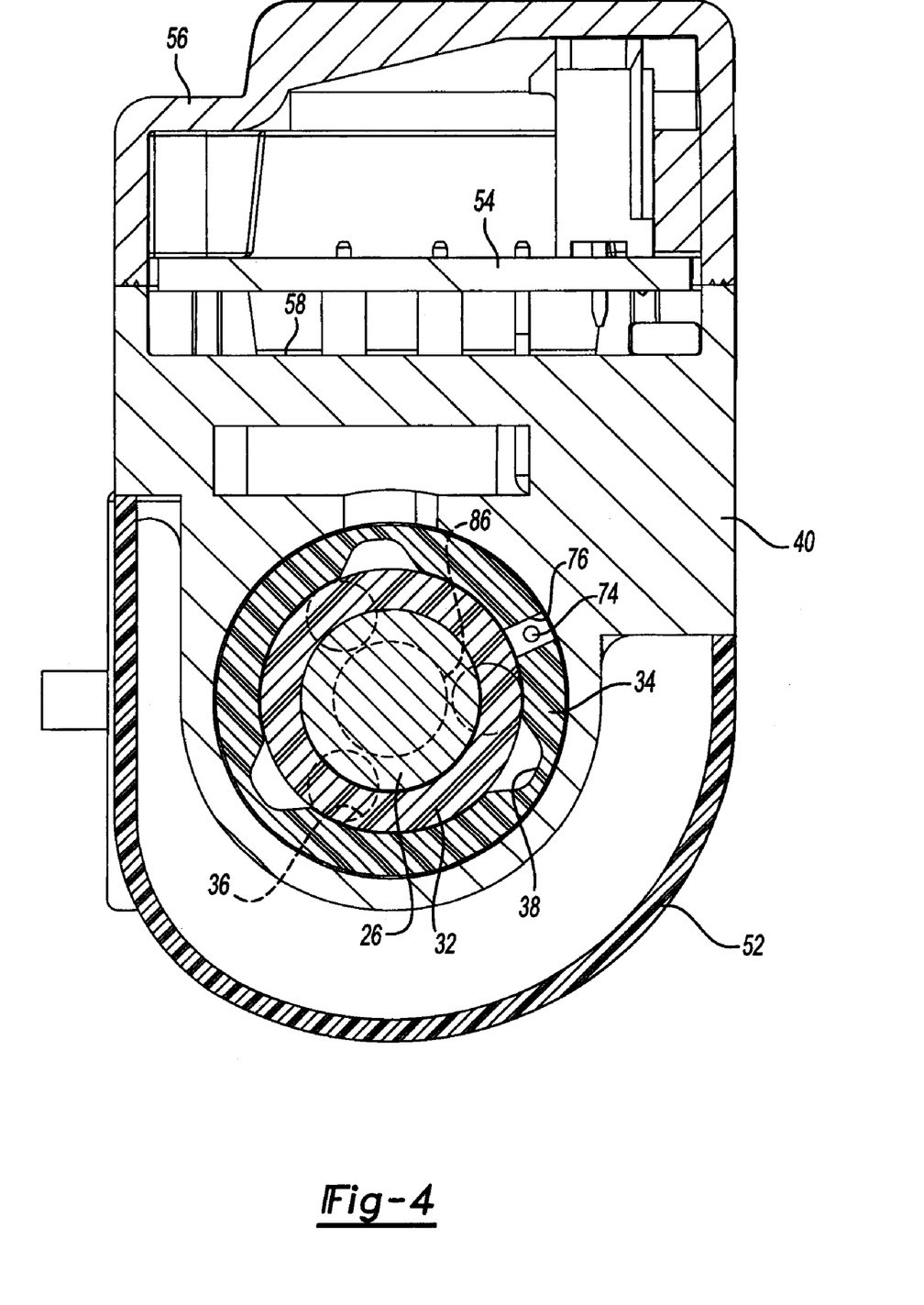
FIG. 4 is a view taken along line 4-4 in FIG. 1.

Referring to FIG. 4, the latch actuator 19 is shown at a section line indicated as 4-4 in FIG. 1. The actuator is shown in its latched position or ready position in FIG. 4 with the ball bearings 36 disposed within the ball receptacle 82 of the tubular retainer 32. The ball bearings are also partially received within the annular slot 86 formed in the power shaft 26. The housing 40 is shown in conjunction with the circuit board cover 56 and the SMA loop cover 52. Circuit board 54 is secured to the circuit board base 58 of the housing 40. As shown in FIG. 4, the power shaft 26 is retained by the annular ring 34 in the latched position. When a signal is received at the circuit board 54, current may be provided to the SMA loop (not shown) in FIG. 4 causing the SMA loop to shrink from a first length to a second length wherein the second length is shorter than the first length. When the loop is contracted by the application of current, the annular ring 34 is rotated by the loop 48 pulling the loop receiving protrusion 50 that is shown in FIGS. 2 and 3.

Figure 5:
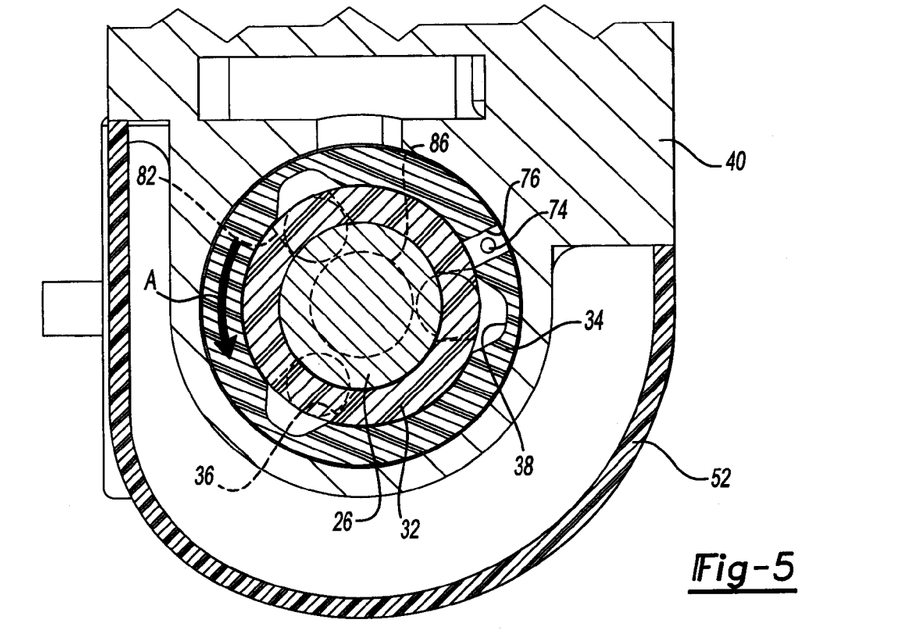
FIGS. 5 and 6 are fragmentary cross-sectional views taken along a line comparable to the section shown in FIG. 4 showing the latching ring of the linear motion actuator in two positions as it is being rotated to align the ball bearings with the grooves.

Referring to FIG. 5, the annular ring 34 is shown being rotated in a counter-clockwise direction by the directional arrow "A" shown on the annular ring 34. In this position, the ball bearings 36 are poised over the axially extending grooves 38. The clearance provided by the grooves 38 permits the ball bearings 36 to move out of the annular slot 86 in the power shaft 26.

Figure 6:
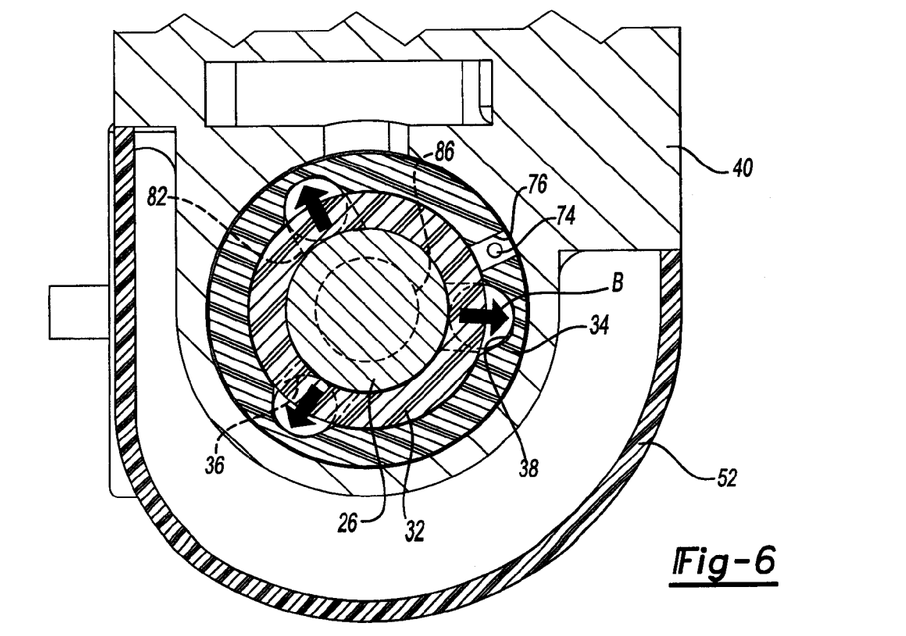

Referring to FIG. 6, the ball bearings 36 are indicated by the reference arrows "B" to be shifted into the axially extending grooves 38. When the ball bearings 36 are fully received in the axially extending grooves 38, the power shaft 26 is free to be extended by the action of the power spring 30 (not shown in FIG. 6) in the axial direction.

Figure 7:
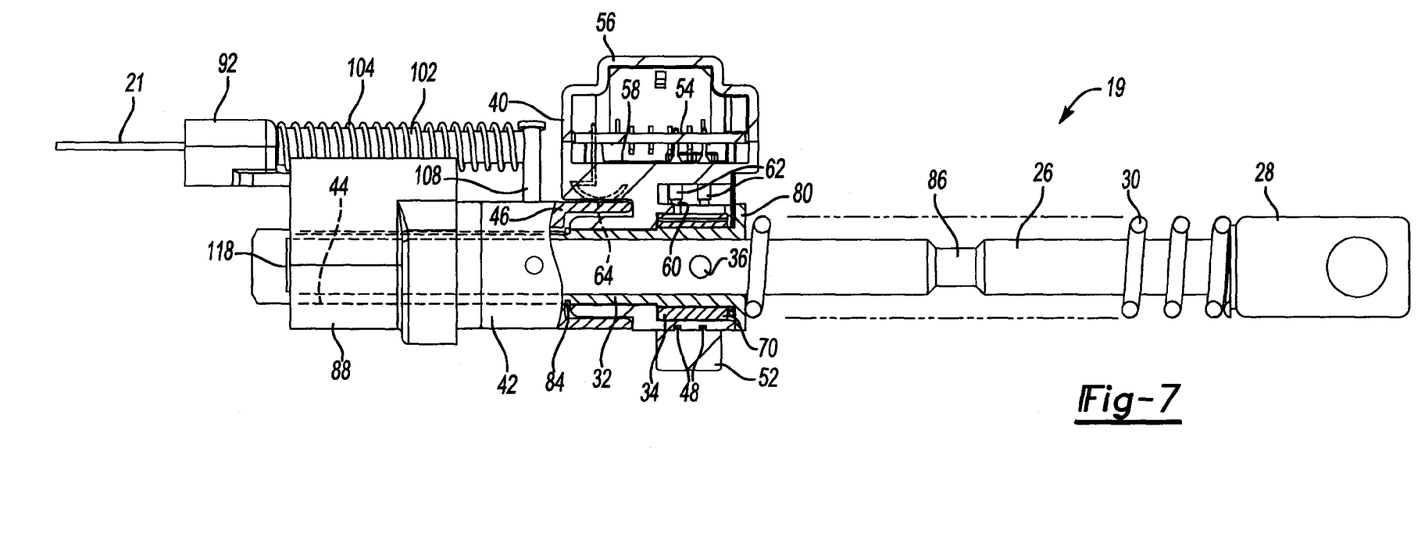
FIG. 7 is a longitudinal cross-sectional view showing the linear motion actuator in its actuated position.
Figure 8:
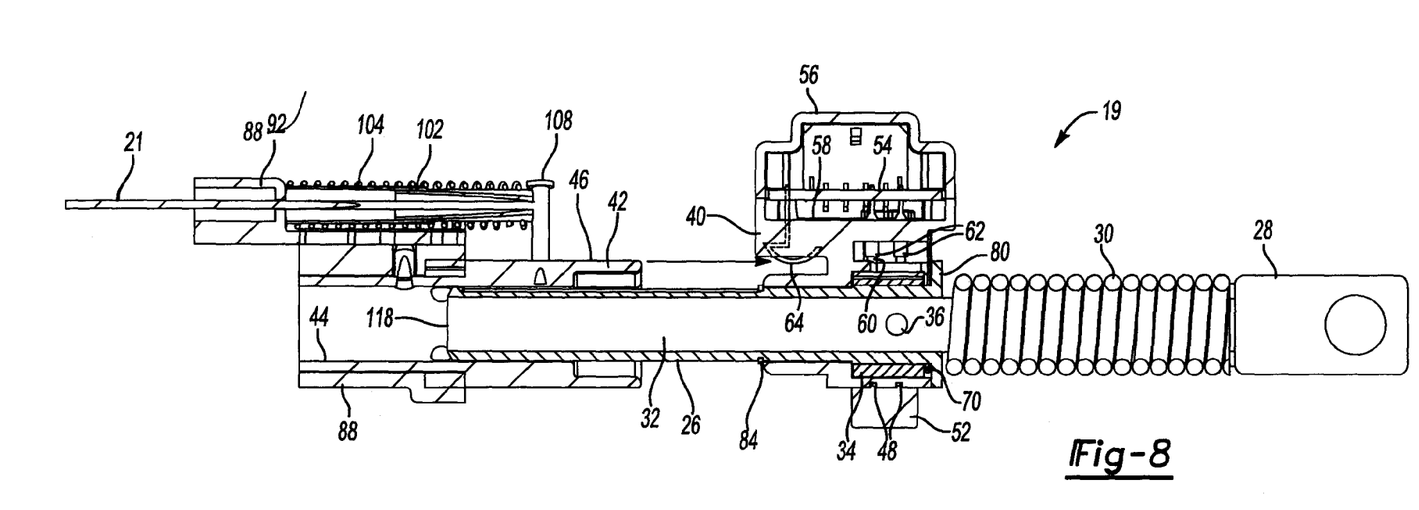
FIG. 8 is longitudinal cross-sectional view showing the linear motion actuator in its ready for reset position.

Referring to FIGS. 7 and 8, the electronic latch actuator 19 is shown in two positions. In FIG. 8, the actuator is shown in its ready or latched position with the power shaft 26 retracted into the housing 40. In FIG. 7, the electronic latch actuator 19 is shown in its extended or actuated position wherein the power shaft 26 is shifted to the right, as shown in FIG. 7, driving the connector 28 to release the seat back 12.

Referring to FIG. 8, the electronic latch actuator 19 is shown with the power shaft 26 in the latched position. In this position, the annular ring 34 is in its latched or beginning position and no power is provided to the SMA loop through the SMA loop terminals 60 that are connected to the loop terminal receptacles 62. The loop terminal receptacles 62 are electrically connected to the circuit board 54. The circuit board 54 is protected by the circuit board cover 56 and is assembled to the housing 40 at the circuit board base 58. The lockout terminals 64 extend through the housing 40. The reset shaft receptacle 42 is spaced from the lockout terminals 64 so that the contact area 46 does not make contact with the terminals 64.

Referring to FIG. 7, the power shaft 26 is shown in its extended or actuated position. In this position, the contact area 46 of the reset shaft receptacle 42 is pulled into contact with the lockout terminals 64 as the power shaft 26 shifts to the actuated position. The contact area 46 is formed or covered with a conductive surface that completes an electrical circuit between the two lock-out terminals 64. The power spring is shown expanded in FIG. 7 with the annular slot 86 in the power shaft 26 being released from the annular ring 34.

In the actuated position, the contact area 46 completes an electrical connection between the lockout terminals 64 thereby enabling a lockout circuit to prevent the circuit board 54 from providing current to the SMA loop terminals 60 that are connected to the loop terminal receptacles 62. The loop terminal receptacles 62 are connected to the circuit board 54.

Figure 9:
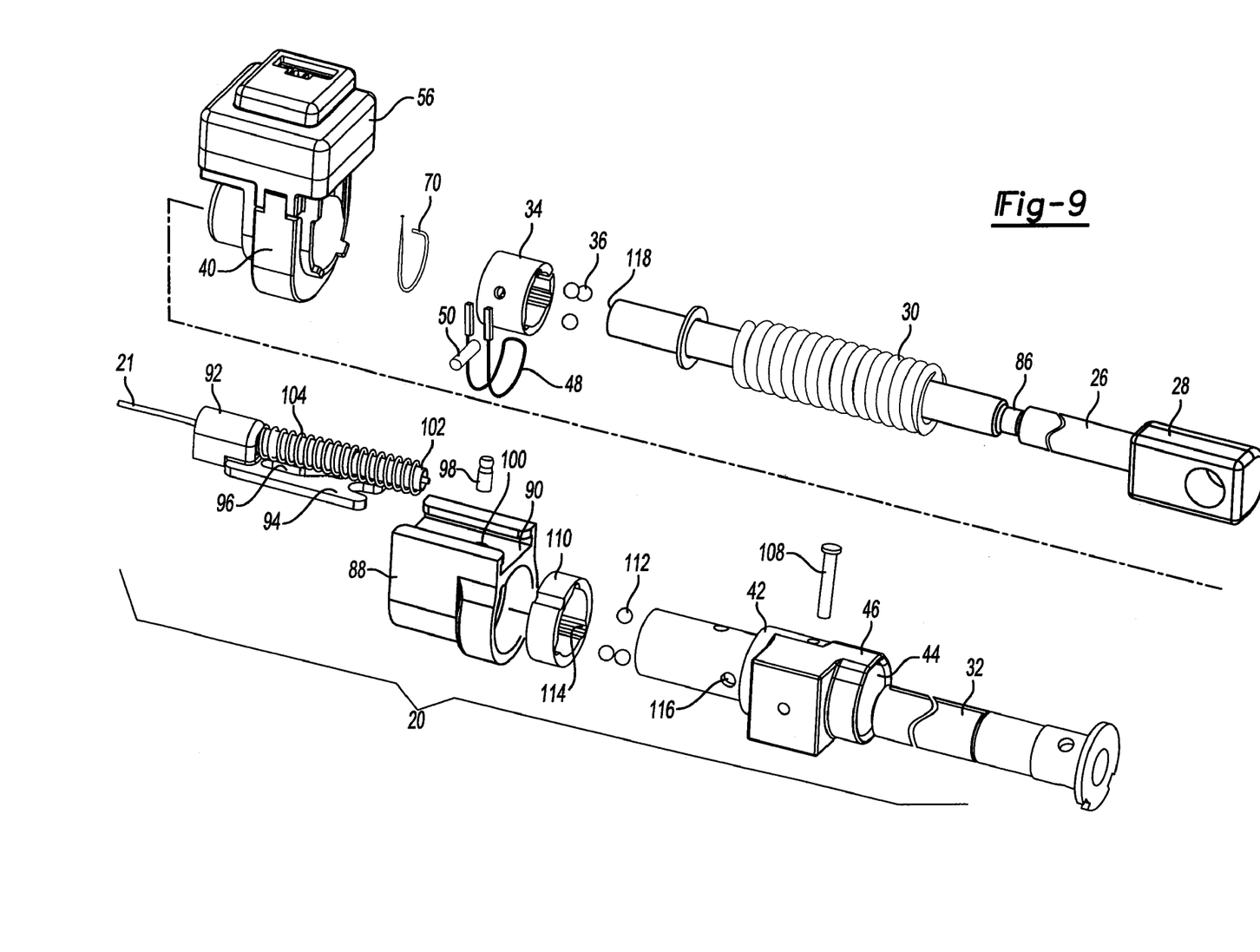
FIG. 9 is an exploded perspective view of the linear motion actuator including a reset apparatus.

The automatic reset of the actuator 19 is described with reference to FIG. 9. The actuator mechanism previously described with reference to FIGS. 1-8 are shown in FIG. 9, but will not be described again for brevity. Instead, FIG. 9 is used to describe the automatic reset function. A reset housing 88 includes a slide track 90 that receives the slider assembly 92 in a "lost motion" relationship. The slider assembly 92 includes a slider plate 94 that defines a slot 96. The slot 96 receives a guide pin 98 that is received in a hole 100 formed in the reset housing 98 as shown. The slider assembly 92 includes a tube 102 over which a return spring 104 is assembled. The cable strand 21 extends through the slider assembly 92 and is secured to a cable anchor pin 108. Cable anchor pin 108 is attached to the reset shaft receptacle 42. A rotary reset thimble 110 is assembled to the reset shaft receptacle 42. A plurality of lock balls 112 are assembled within axially extending slot 114 in the rotary reset thimble 110 and are also received in a corresponding plurality of holes 116 located on the reset shaft receptacle 42.

Referring to FIGS. 1 and 9, the reset cable strand 21 is anchored at the stationary seat tumble pivot bracket 22. The cable conduit fitting 23 is fixed to the seat cushion frame 14 so that when the seat 10 tumbles and rotates counter-clockwise (as shown) about its tumble pivot 24, the effective length of the cable strand 21 retracts the reset apparatus 20. The reset function is immediately initiated after the SMA actuator 19 is released and the seat 10 begins to tumble forward. The retraction force applied between the fixed cable anchor pin 108 and the movable slider 92 causes the slider 92 to move towards the cable anchor pin 108. The slider assembly 92 and its associated slot 96 engages the pin 98 which is fixed to the rotary reset thimble 110. The slider assembly 92 slides along its longitudinal axis and causes the pin 98 to move laterally relative to the longitudinal axis. This lateral movement of the pin imparts a rotary movement to the rotary reset thimble 110.

The rotary reset thimble 110 has axially extending grooves 114 that keep the lock balls 112 in a locked position against the tapered end 118 of the shaft 26. When rotated, as described above, the axial grooves 114 and the rotary reset thimble 110 permit the lock balls 112 to move to an unlocked position where they are received in the holes 116 formed on the reset shaft receptacle 42 which allows the reset apparatus 20 to slide towards the actuator 19. When the reset subassembly 20 slides toward the actuator 19, the distance between the actuator 19 and the reset assembly 20 is shortened. At this point, the contact area 46 engages the lock-out terminal 64. At this point, the floor latches may be re-engaged as a result of the seat being returned to the design position. When the seat 10 is manually returned from the tumble position to the design position, the actuator 19 is returned to the original design position.

When the actuator 19 is initially fired, the seatback 12 falls forward and immediately starts recompressing the power spring 30. After the power spring is fully compressed, the ball bearings 36 are re-locked. The actuator 19 is automatically re-cocked and ready for the next cycle. The spring 104 and tubes 102 provide a biasing force to return the slider assembly 92, the reset thimble 110 and the lock balls 112 to their design, locked position when the seat 10 is returned to its original design locked seating position.

Figure 10:
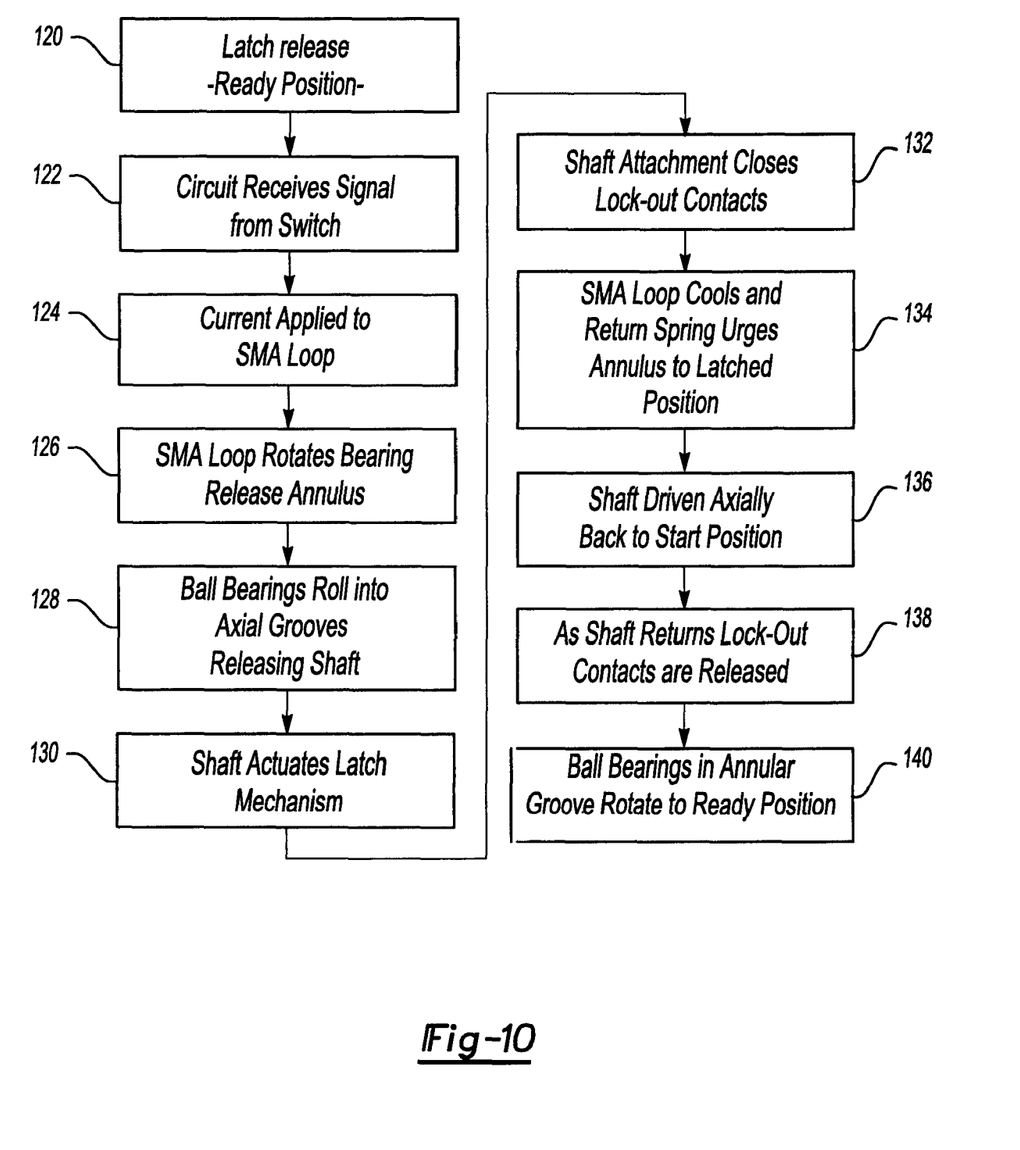
FIG. 10 is a process flowchart that describes the steps followed by the system for actuating a latch mechanism according to one embodiment of the present invention.

Referring to FIG. 10, operation of the electronic latch actuator 18 is described in sequence. The description of the operation begins with the latch being in its ready position, as indicated by reference numeral 120. At 122, the circuit receives a signal from a switch. The switch may be a push-button switch in the interior of the vehicle, a switch on a radio-frequency key fob, or a switch internal to a microprocessor, or the like. At 124, the circuit provides current to the SMA loop causing the SMA loop to change its length. The current causes SMA loop to change from a longer loop to a shorter loop. The SMA loop rotates the bearing release annulus at 126 as a result of the change in length of the SMA loop. Ball bearings 36, at 128, roll into the axial grooves 38 in the annular ring 34. When the grooves 38 are aligned with the ball bearings 36, the force of the power spring 30 drives the power shaft 26 to actuate the latch mechanism, at 130. The ball bearings 36 shift outwardly from the annular slot 86 in the power shaft 26 and into the axial grooves 38.

The shaft attachment or reset shaft receptacle 42 closes the lockout terminals 64, at 132, preventing additional current from being provided to the SMA loop. At 134, the SMA loop 48 cools and the return spring 70 urges the annular ring 34 towards the latched, or ready, position. At 136, the shaft 26 is driven axially back to the start position. The shaft is driven back, at 138, to the start position by repositioning the latched members. Repositioning the latched members causes the power shaft 26 to be moved toward its ready position. As the shaft returns, the lockout terminals 64 are opened when the contact area 46 is moved out of engagement with the lockout terminals 64 by movement of the power shaft 26. In the final step of the resetting process, at 140, the ball bearings in the annular grooves 38 of the annular ring 34 are rotated to the ready position in which the ball bearings 36 are again received in the annular slot 86.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A linear motion actuator comprising:
   a housing having a cavity;
   a actuator shaft has a first end that is received in an opening formed in the housing, the actuator shaft may be in a ready position in which the actuator shaft is partially retracted within the housing and the actuator shaft may be placed in an actuated position in which the actuator shaft is extended from the housing to a greater extent than when the actuator shaft is in the ready position;
   a spring attached to the actuator shaft that exerts a biasing force on the actuator shaft to bias the actuator shaft toward the actuated position;
   a latching ring is disposed within the housing and receives the first end of the actuator shaft in an opening formed in the latching ring, the latching ring having a locking element that holds the actuator shaft within the latching ring when in the ready position, the locking element being selectively released by rotating the latching ring;
   a shape memory alloy link anchored to the housing and extending a first length partially around the latching ring and being secured to the latching ring, the link being shortened to a second length that is shorter than the first length when a current is applied to the link, wherein the link rotates the latching ring when shortened and causes the locking element to be released.

2. The linear motion actuator of claim 1 further comprising a connector that is disposed on the second end of the actuator shaft that releases a latched member.

3. The linear motion actuator of claim 2 wherein the spring attached to the actuator shaft is assembled over the actuator shaft and engages the housing and the connector in the ready position.

4. The linear motion actuator of claim 1 wherein the latching ring receives a tubular member that receives the actuator shaft, a plurality of ball bearings are assembled in a plurality of holes in the tubular member and into an annular groove in the actuator shaft, the latching ring having a plurality of axially extending grooves, the ball bearings hold the tubular member and actuator shaft in the ready position until the link is shortened which rotates the latching ring until the grooves are aligned with the ball bearings to allow the ball bearing to move within the grooves and the actuator shaft to move to the released position.

5. The linear motion actuator of claim 1 further comprising a return spring that biases the latching ring to rotate in the opposite rotary direction relative to the direction that the link rotates the latching ring when current is applied to the link.

6. The linear motion actuator of claim 1 further comprising an electrical circuit that includes an actuation signal and provides the current to the link.

7. The linear motion actuator of claim 6 further comprising at least two terminals electrically connected to the electrical circuit that are selectively connected by a metallic portion of the actuator shaft.

8. The linear motion actuator of claim 6 further comprising at least two terminals electrically connected to the electrical circuit that are selectively connected by a metallic attachment to the actuator shaft.

9. The linear motion actuator of claim 1 further comprising an electrical circuit that prevents current from being provided to the link for a period of time that corresponds to the time required for the link to return from the second length to the first length.

10. The linear motion actuator of claim 1 further comprising a reset apparatus received on the actuator shaft and is movable relative to the housing, the reset apparatus being shifted away from the housing when the locking element is released, a reset cable being secured to the reset apparatus and a portion of a seat, wherein movement of the seat causes the actuator shaft to be returned toward the housing and the reset cable acts upon the reset apparatus to return the reset apparatus to a locked position.

11. The linear motion actuator of claim 10 wherein the reset apparatus has a slider assembly that is locked to a reset shaft receptacle in the locked position by a rotary reset thimble and a plurality of lock balls that are assembled to the reset shaft receptacle, the reset cable strand is secured to the slider assembly, wherein the reset cable strand pushes the slider assembly to the locked position to return the reset apparatus to the locked position.

12. A system for actuating a latch mechanism comprising:
   providing an electrical signal to a circuit for a latch release mechanism;
   supplying current to a link of a first length that changes to a second length that differs from the first length;
   rotating a release annulus in a first rotary direction that cooperates with a plurality of ball bearings, a sleeve having holes for partially receiving the ball bearings and an actuator shaft having an annular groove, the release annulus having a plurality of axially extending grooves that when aligned with the ball bearings to partially receive the ball bearings permits the actuator shaft to move in a first axial direction relative to the annulus;
   actuating the latch mechanism by the axial movement of the actuator shaft in the first axial direction;
   driving the actuator shaft in a second axial direction that is opposite to the first axial direction until the annular groove is aligned with the ball bearings in the sleeve; and
   partially rotating the annulus to move the ball bearings out of the axially extending grooves in the release annulus.

13. The system of claim 12 wherein the link is a loop of shape memory alloy wire that is wrapped around a portion of the annulus and is operatively connected to the annulus to partially rotate the annulus when the loop changes from the first length to the second length.

14. The system of claim 12 further comprising a return spring that exerts a rotary biasing force on the annulus in a second rotary direction that is opposite the first rotary direction, wherein the return spring partially rotates the annulus to move the ball bearings out of the axially extending grooves in the release annulus.

15. The system of claim 12 wherein the circuit includes a lockout portion that includes a pair of switch contacts that are open when the latch mechanism is in a ready condition, wherein the switch contacts are closed when the actuator shaft moves in the first axial direction preventing supplying current to the link when the switch contacts are closed.

16. The system of claim 15 wherein the link is permitted to cool when current is prevented from being provided to the link.

17. The system of claim 16 wherein the switch contacts are opened when the actuator shaft is driven in the second axial direction.

18. The system of claim 12 further comprising resetting the latch mechanism by shifting the actuator shaft in the first axial direction and by moving a reset apparatus toward the actuator shaft.

19. The system of claim 18 further comprising a reset cable operatively connected to the reset apparatus which moves the reset apparatus toward the actuator shaft.

* * * * *